United States Patent
Jung et al.

[19]

[11] Patent Number: 6,006,788
[45] Date of Patent: Dec. 28, 1999

[54] FLEXIBLE PIPE WITH INTERNAL GASPROOF UNDULATING METAL TUBE

[75] Inventors: Patrice Joël Louis Jung, La Mailleraye Sur Seine; Anh Tuan Do, Cormeilles en Parisis, both of France

[73] Assignee: Coflexip, France

[21] Appl. No.: 09/117,670

[22] PCT Filed: Dec. 3, 1997

[86] PCT No.: PCT/FR97/02192

§ 371 Date: Aug. 4, 1998

§ 102(e) Date: Aug. 4, 1998

[87] PCT Pub. No.: WO98/25063

PCT Pub. Date: Jun. 11, 1998

[30] Foreign Application Priority Data

Dec. 4, 1996 [FR] France ................................. 96 14892

[51] Int. Cl.⁶ .............................. F16L 11/16; F16L 1/08; F16L 11/20
[52] U.S. Cl. ........................... 138/131; 138/135; 138/134
[58] Field of Search ..................... 138/131, 134, 138/135, 129

[56] References Cited

U.S. PATENT DOCUMENTS

| | | |
|---|---|---|
| 2,720,221 | 10/1955 | Neilson . |
| 4,344,462 | 8/1982 | Aubert et al. ............................ 138/135 |
| 5,813,439 | 9/1998 | Herrero et al. .......................... 138/134 |
| 5,934,335 | 8/1999 | Hardy ....................................... 138/131 |

FOREIGN PATENT DOCUMENTS

| | | |
|---|---|---|
| 1333402 | 6/1963 | France . |
| 1477478 | 4/1967 | France . |
| 2126616 | 10/1972 | France . |
| 2458022 | 8/1984 | France . |
| 1486445 | 9/1977 | United Kingdom . |
| 96/17198 | 6/1996 | WIPO . |

*Primary Examiner*—Andres Kashnikow
*Assistant Examiner*—Davis Hwu
*Attorney, Agent, or Firm*—Ostrolenk, Faber, Gerb & Soffen, LLP

[57] ABSTRACT

The invention concerns a flexible conduit comprising an internal gasproof undulating metal tube (1), the wall of which has helical undulations (8), the external surface of said internal tube having at least concave (10) and convex (11) rounded parts corresponding to the internal and external parts of the undulations respectively, and at least an arch (2) arranged around said internal metal tube and made up of at least a form wire (9) coiled in spires. The invention is characterized in that the arch (2) has an internal surface with helical undulation, comprising at least concave (16) and convex (15) rounded parts and the external surface of the internal metal tube is supported in its concave rounded part (10) by a convex part (15) of the arch (2) internal surface and in its convex rounded part (11) by a concave part (16) of the arch internal surface, said internal arch surface and said internal tube external surface matching in form and the interstices (i) between the adjacent spires are small. The invention is particularly applicable to flexible conduits used in oil mining.

29 Claims, 5 Drawing Sheets

FIG.1

FIG_4

FIG_2

FLEXIBLE PIPE WITH INTERNAL GASPROOF UNDULATING METAL TUBE

BACKGROUND OF THE INVENTION

The present invention relates to a long flexible pipe having an impermeable internal metal tube and more particularly to a flexible pipe including an internal corrugated metal tube which is, in particular, gas-impermeable.

The present invention also relates to a flexible pipe for transporting fluids at high pressure such as, for example, that used during operations for extracting crude oil from a subsea deposit. Such a pipe must, in particular, withstand the various forces to which it is subjected such as, for example, the internal and/or external pressures developed in and on the said flexible pipe, and must have a degree of flexibility along its longitudinal axis so that it can bend without risk of rupturing.

Under extreme service conditions such as, for example, in Arctic regions where very difficult climatic conditions prevail or else for transporting liquefied natural gas, it has been proposed to use either rigid steel pipes or flexible pipes which include an internal corrugated metal tube, as described in FR-A-2,458,022.

Other structures are also described in WO 96/17198 or GB-A-1,486,445.

The flexible pipe described in FR-A-2,458,022 comprises, from the inside to the outside:

an internal corrugated metal tube;

a metal casing wound around the internal corrugated tube and consisting of profiled wires, the winding pitch of which is in the opposite direction to the pitch of the corrugations of the said internal corrugated tube, this metal casing providing the bursting strength and called a pressure vault;

two crossed armouring plies which provide the resistance to tensile loads and to the end cap effect due to the internal pressure of the pipe; and an external sleeve for protection and sealing.

In a variant, it is proposed to use as pressure vault a winding of a round wire which is housed in the troughs of the corrugations of the internal corrugated tube.

However, such a pipe has many drawbacks both with regard to the structure and from the behavior standpoint.

In order to reinforce the internal corrugated tube, it is internally lined with an overlapping flat and welded spiralled metal tape or with a smooth tape, the space between the corrugations of the internal tube and the tape being optionally filled with a filling material. Consequently, this is a substantially more rigid structure which must be wound onto a large-diameter drum and which is fragile during the unwinding and winding operations in manufacture. When the corrugated tube is not reinforced with the aforementioned tape, then any momentary elongation of the pipe, as occurs when it is under tension, may generate a permanent elongation of the internal tube sometimes leading to rupture. Finally, whatever the recommended pressure vault, there is a risk of ovalizing the internal tube.

Whatever the circumstances, the flexible pipe of the prior art is unable to withstand the very high external pressures which develop at great depths, of the order of several thousands of meters, and/or the very high internal pressures developed in the pipe during exploitation operations.

The object of the present invention is to remedy the aforementioned drawbacks and to provide a flexible pipe which not only is capable of withstanding pressures of several hundred bar exerted on the outside and/or on the inside of the pipe, but also of being able to be used at high temperatures and in an acid medium, i.e. capable of high performance in a corrosive medium, and of being suited for what those skilled in the art call "SOUR SERVICE".

The subject of the present invention is a flexible pipe of the type comprising, from the inside to the outside, an internal corrugated metal tube, a pressure vault obtained by winding at least one shaped wire around the said internal tube, a polymeric sleeve around the said pressure vault, at least one armoring ply for resistance to tensile loads and an impermeable external sleeve, the pressure vault having a helical corrugated inner surface comprising at least concave and rounded parts and convex rounded parts, the outer surface of the internal metal tube bearing in its concave rounded part on a convex part of the inner surface of the pressure vault and in its convex rounded part on a concave part of the inner surface of the pressure vault, the said inner surface of the vault and the said outer surface of the internal tube being in shape correspondence, and it is characterized in that the ratio of the height (h) of a corrugation (8) to the pitch (T) of the said corrugation is less than 1 and greater than 0.035, the gap (i) between two consecutive turns being small but not zero.

According to another characteristic, the flexible pipe is characterized in that the pressure vault is made from a wire wound around the said internal tube, each turn having a width approximately equal to the period of the corrugation of the internal tube.

According to another characteristic, the flexible pipe is characterized in that the gap between two consecutive turns lies more or less vertically in line with a crest of the corrugation of the internal tube.

According to another characteristic, the flexible pipe is characterized in that the gap between two consecutive turns lies more or less vertically in line with a trough of the corrugation of the internal tube.

According to another characteristic, the flexible pipe is characterized in that the pressure vault is made from several wires wound around the internal tube.

According to another characteristic, the flexible pipe is characterized in that the internal corrugated tube has corrugations, the radius of curvature (R) of a crest of which is greater than or equal to the radius of curvature (r) of a trough.

According to another characteristic, the flexible pipe is characterized in that the internal corrugated tube is made of a metallic material having a low modulus of elasticity and being resistant to a corrosive medium.

Other advantages and characteristics will become more apparent on reading the description of several embodiments according to the invention, as well as on examining the appended drawings in which:

DESCRIPTION OF PREFERRED EMBODIMENTS

Figure 1:
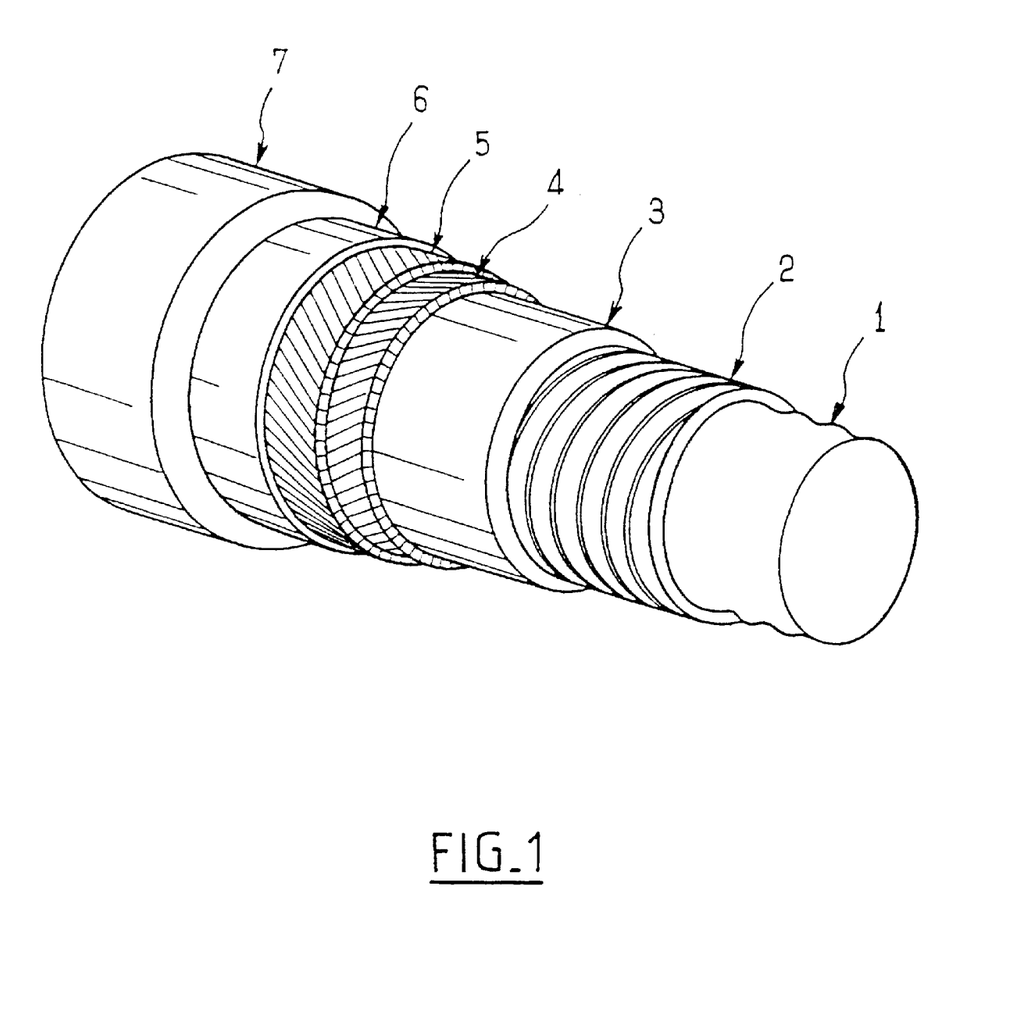
FIG. 1 is a partial view in perspective of a flexible pipe according to the invention, certain parts of which are not complete.

The flexible pipe according to the invention, as illustrated in FIG. 1, comprises, from the inside to the outside, an internal corrugated metal tube 1, a pressure vault 2, a sleeve 3, generally made of a thermoplastic having a high melting point, intended to prevent flattening under the high external pressures exerted on the said pipe and called by those skilled in the art an anticollapse sleeve, two crossed armouring plies 4 and 5, the armoring wires of one ply making an angle of less than 55° with respect to the longitudinal axis A of the pipe, an intermediate tape 6 and finally an external sealing sleeve 7. Apart from the internal tube 1 and the pressure vault 2, which form the subject of the present invention, all the other constituent components of the pipe are well known to those skilled in the art and will therefore not be described in detail, even if some of them, such as the tape 6, have formed the subject of recent improvements, in particular by the Applicant.

The internal corrugated metal tube 1, called hereafter a liner and illustrated in FIGS. 1 to 7, is a metal tube having corrugations 8 uniformly spaced over the entire length, the periodicity of the crests of the corrugations or of the troughs being defined, for the sake of convenience, by a period T even though it may also be denoted by the term "pitch" which is used for the windings.

The period T or pitch of the corrugation (FIG. 2) is identified, by convention, by the projection of the corrugation on the longitudinal axis A of the pipe, which is because the angle of the helix formed by the corrugation is close to 90° with respect to the longitudinal axis A of the pipe.

Figure 4:
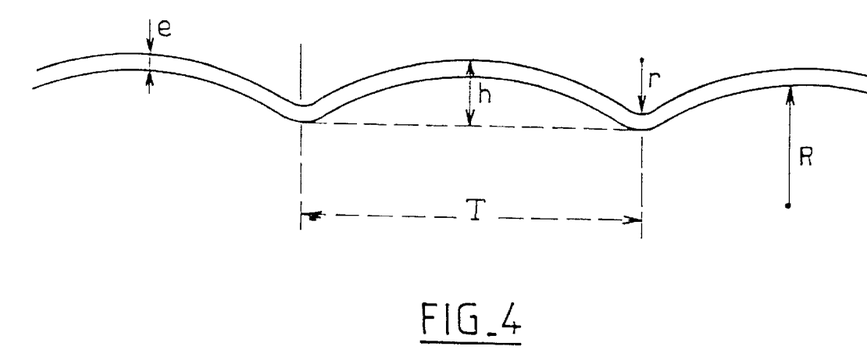
FIG. 4 is a partial view in cross-section of the internal corrugated tube illustrated in FIGS. 1 to 3.

In a preferred embodiment of the invention, the liner 1 consists of an impermeable metal tube having a minimum thickness of 0.15 millimeters and a slight helical corrugation, i. e. one having a relatively small height h. The shape of the corrugation is defined so as to allow elongation under pressure without the risk of rupture, to allow winding for a defined diameter and to increase the flexibility. Tests carried out have shown that the radius of curvature R of a crest must be at least equal to the radius of curvature r of a trough (FIG. 4). Preferably, the radius R must be between 1.5 and 10 times the radius r and better still between 3 and 5 times the radius of curvature r.

Figure 2:
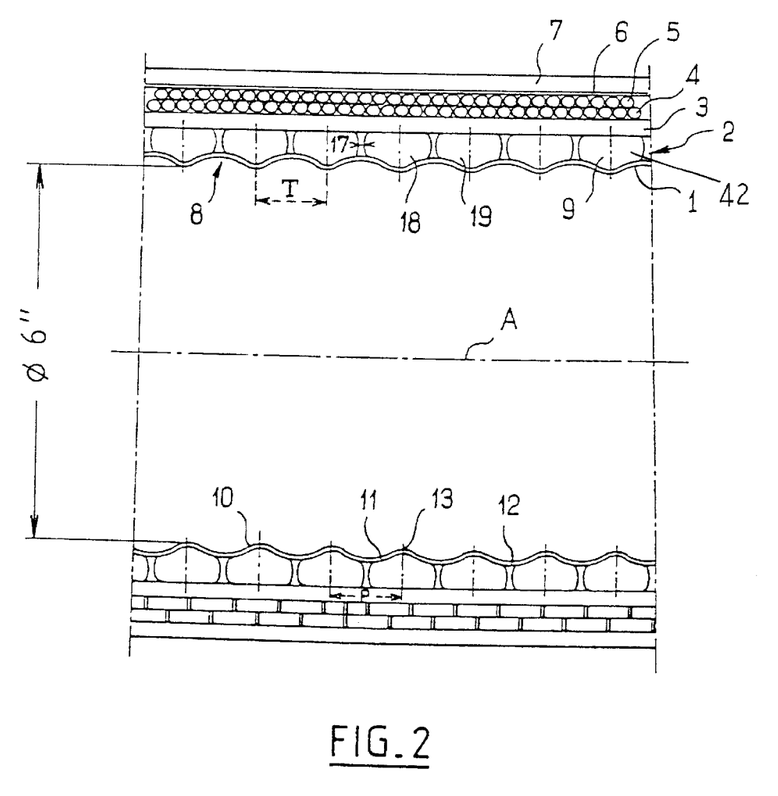
FIG. 2 is a partial diagrammatic representation of a longitudinal section of the flexible pipe of FIG. 1.
Figure 3:
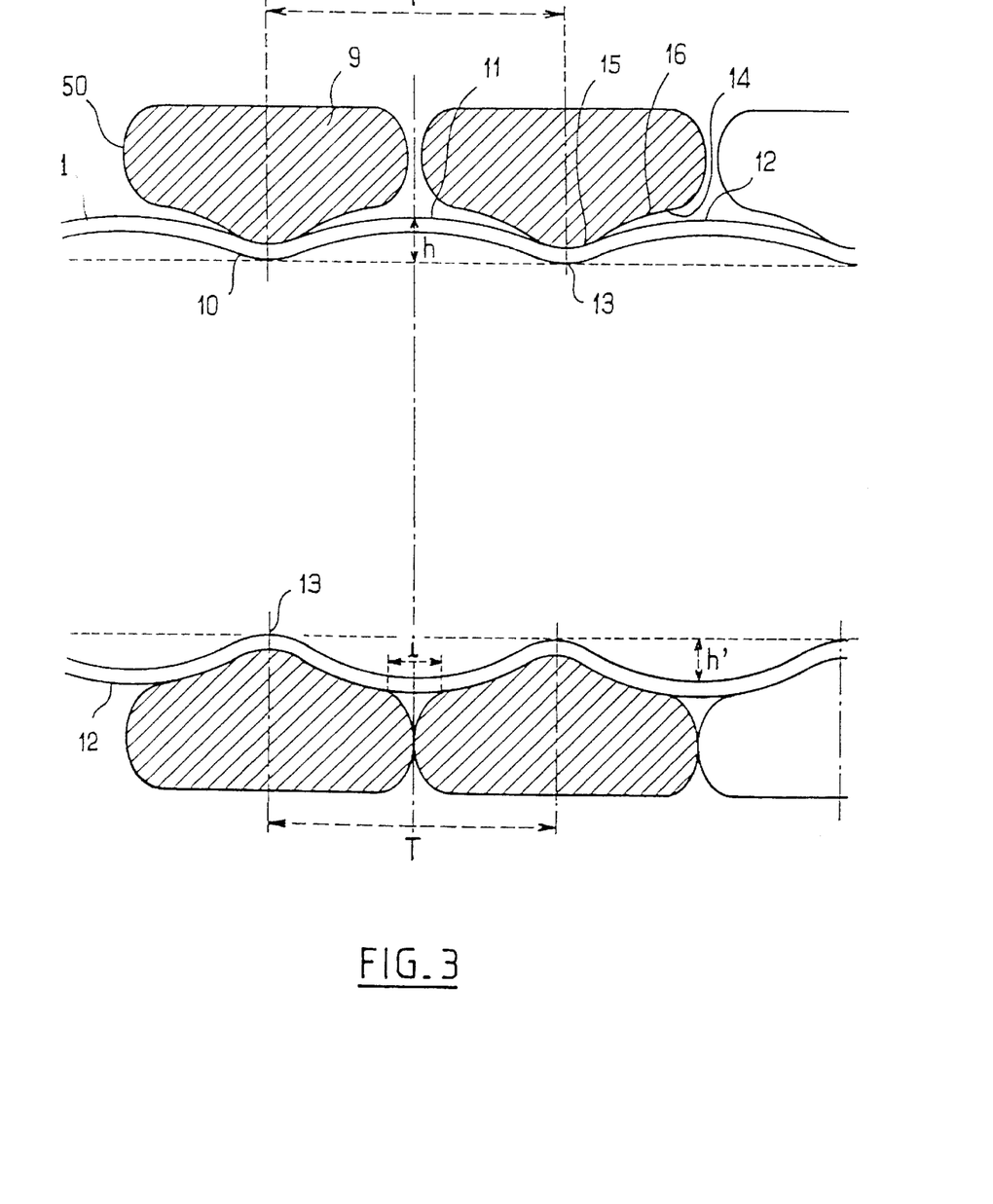
FIG. 3 is a partial enlarged view of part of FIG. 2, the pipe being in flexure.

The pressure vault 2 consists, in a first embodiment illustrated in FIGS. 2 and 3, of a helical winding of a shaped wire 9 around the liner 1.

The corrugation 8 of the liner 1, seen from the outside, comprises concave parts 10 and convex parts 11, the period T being equal to the distance separating two successive crests 12 or two successive troughs 13 of the said corrugation 8.

The shaped wire 9 forming the pressure vault 2 comprises, on its inner surface 114, convex rounded parts 15 and concave parts 116. The concave parts 10 of the liner 1 bear on the convex parts 15 of the shaped wire and more generally the concave parts of the liner 1 bear on the convex parts of the inner surface of the pressure vault 2, taken in its entirety and, when the flexible pipe is straight, as illustrated in FIG. 2.

The shaped wire 9 is wound helically, forming turns which are spaced apart, it being possible for the clearance 17 between two consecutive turns 18, 19 to be zero when the pipe is put into flexure. In the case of FIG. 3, in which the shaped wire 9 is rounded on the lateral edges 50, the clearance 17 does not correspond to the gap i, whereas in FIGS. 5 to 7 the clearance is equal to the gap i since the lateral edges of the wire are straight and perpendicular to the longitudinal axis A. Gap i could be understood to mean the space separating two consecutive turns which is taken on the inner surface of the pressure vault 2.

The correspondence between the outer surface of the liner 1 with the inner surface of the pressure vault results in bearing parts being defined which have more or less identical geometrical characteristics. Thus, the convex parts 15 of the inner surface of the pressure vault have a radius of curvature which is equal to the radius of curvature r of the concave parts 10 of the outer surface of the liner 1.

In the case of FIGS. 2 and 3, the winding pitch P of the shaped wire 9 is equal to the period T of the corrugation 8 of the liner 1, and the clearance 17 between two consecutive turns 18, 19 lies opposite the crest or top 12 of the corrugation 8.

As may be seen in FIG. 3, the turns 18, 19 are not completely touching on the outer fiber (upper part of the figure), whereas they are touching on the inner fiber (lower part of the figure) because of the fact that the flexible pipe is in flexure.

The shape correspondence between the outer surface of the liner 1 and the inner surface of the pressure vault 2, and because they bear on each other over a large proportion of the surface and because of the small clearance between turns, means that, when the pipe is put into flexure, the neutral fiber, which is normally in coincidence with the longitudinal axis A, can move slightly towards the inner-fiber surface of the liner. Thus, the risk of localized buckling in the concave and/or convex inner-fiber parts of the liner 1 is avoided or greatly reduced. Consequently, the clearance 17 between the consecutive turns which existed in the inner fiber disappears and the said turns are touching whereas, in the outer fiber, the clearance 17 increases and the liner 1 is therefore put into tension, the winding pitch and the period of the corrugation increasing in turn. The convex parts 11 of the liner 1 partially separate from the inner surface of the pressure vault and work in the manner of a membrane when a pressurized fluid flows in the flexible pipe.

In a preferred embodiment of the invention, the ratio of the height h of the corrugation 8 to the thickness e of the liner 1 is between 1 and 30 and preferably between 1.5 and 20 (FIG. 4). In addition, the ratio h/T is less than 1 and greater than 0.05 and preferably lies between 0.15 and 0.35. The clearance 17 between consecutive turns is small and less than 0.15 1, 1 being the width of a turn.

In order to prevent the liner 1 from deforming due to the effect of the internal pressure of the fluid flowing in the flexible pipe and to ensure contact between the liner 1 and the pressure vault 2 over the entire circumference of the liner 1, it is preferable to use materials having a low modulus of elasticity such as certain steels, titanium, aluminium or aluminium alloys. The choice of material must take account of the resistance to the corrosive medium.

Since the liner 1 is gas-impermeable and resistant to a corrosive medium, it is no longer necessary to take the criterion of resistance to a corrosive medium into account when choosing the material constituting, in particular, the pressure vault 2. For the latter, it is sufficient to choose a material having high mechanical properties and able to be easily formable. Among the possible materials, mention may be made of a steel of the XC 35 type according to the usual standards. This is also true for the tension armouring; consequently, the weight and cost of the flexible pipe may be considerably reduced.

Finally, because the metal liner 1 is gas-impermeable, the anticollapse sleeve 3 may be made of a lower-performance material than that normally used in flexible pipes, the sole criterion to be taken into consideration being the temperature withstand capability.

Figure 5:
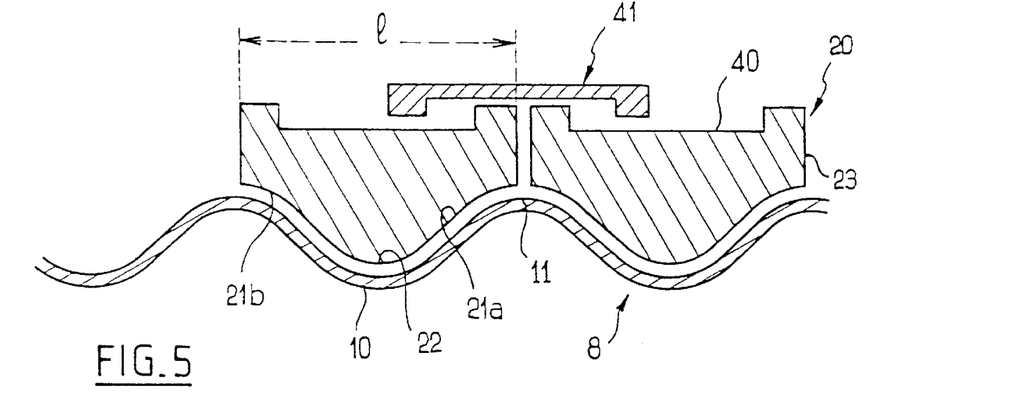
FIG. 5 is a partial diagrammatic cross-sectional view of a vault/internal corrugated tube assembly according to a first embodiment of the invention.

FIG. 5 illustrates another embodiment in which the liner 1 is identical to that illustrated in FIGS. 2 to 4, but its pressure vault 2 is made with a shaped wire 20, each turn of which has two concave parts 21$a$ and 21$b$ lying on each side of a convex part 22. Consequently, the concave parts 21$a$ and 21$b$ of two consecutive turns match the convex part 11 of the liner 1, the clearance 17 existing between the two consecutive turns being equal to the gap i and lying opposite the crest or top 12 of the convex part 11, this being because the lateral edges 23 of the shaped wire 20 are straight and perpendicular to the longitudinal axis A. In addition, the width l of each turn is approximately equal to the period T of the corrugation.

Figure 6:
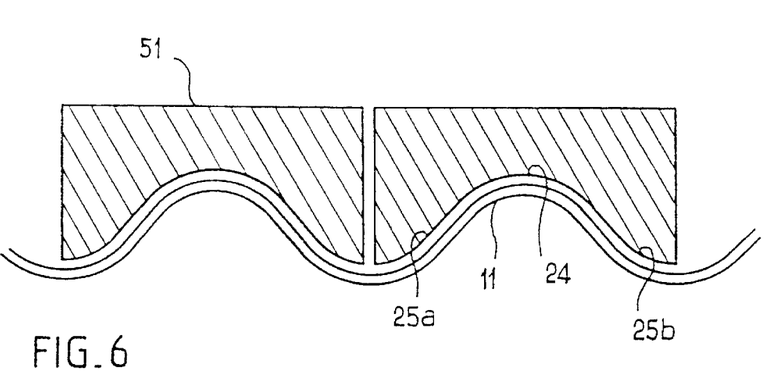
FIG. 6 is a partial diagrammatic cross-sectional view of a vault/internal corrugated tube assembly according to another embodiment of the invention.

FIG. 6 illustrates an embodiment which is similar to that in FIG. 5, except that each turn comprises a concave part 24 which matches the shape of the corresponding convex part 11 of the liner 1, the said concave part 24 being surrounded by two convex parts 25$a$ and 25$b$. In this case, the gap i lies opposite the trough of the corrugation.

Figure 7:
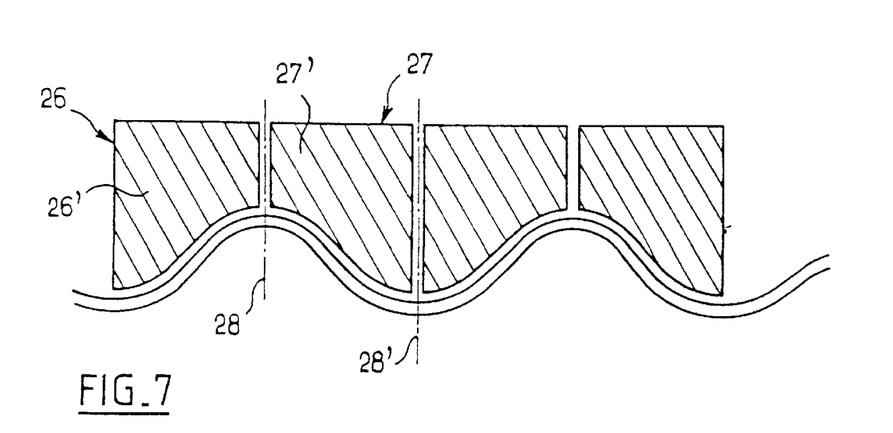
FIG. 7 is a partial diagrammatic cross-sectional view of a vault/internal corrugated tube assembly according to another embodiment of the invention.

In another embodiment illustrated in FIG. 7, the pressure vault 2 consists of two alternate windings of shaped wires 26 and 27 which are in such a way that two consecutive turns 26' and 27' are symmetrical with respect to the junction planes 28 and 28'. The junction plane 28' passes through the bottom of a trough of the corrugation 8 while the junction plane 28 passes through the top of the crest of the said corrugation, the objective being that two consecutive turns 26', 27' of the two alternate windings form something akin to the single turn in the FIGS. 5 or 6.

Figure 8:
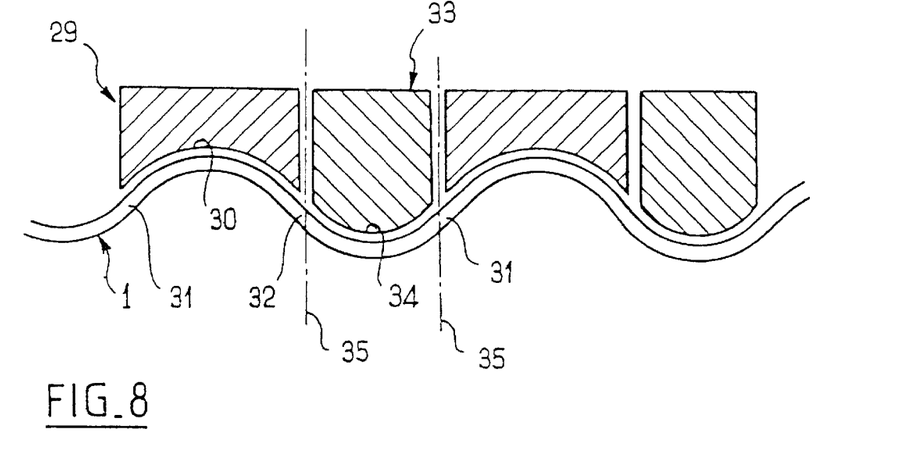
FIGS. 8 and 9 are, respectively, partial diagrammatic cross-sectional views of the vault/internal corrugated tube assemblies according to other embodiments of the invention.

FIG. 8 illustrates another embodiment in which the liner 1 is identical to the previous embodiments, while the pressure vault 2 consists of a winding of two differently shaped wires. The first shaped wire 29 has a part 30, of concave shape, which matches the convex part of the liner 1 and extends between two consecutive inflection points 31, 32 of a corrugation. The second shaped wire 33 has a part 34, of convex shape, which matches the concave part of the liner 1 and extends between two consecutive inflection points; the combination of the shaped wires 29 and 23 may be likened to a single turn which would have a width equal to the period T of the corrugation, apart from the gaps. In this case, the gaps lie opposite the mid-part 35 of the corrugation, lying between the convex and concave parts of the liner 1.

Figure 9:
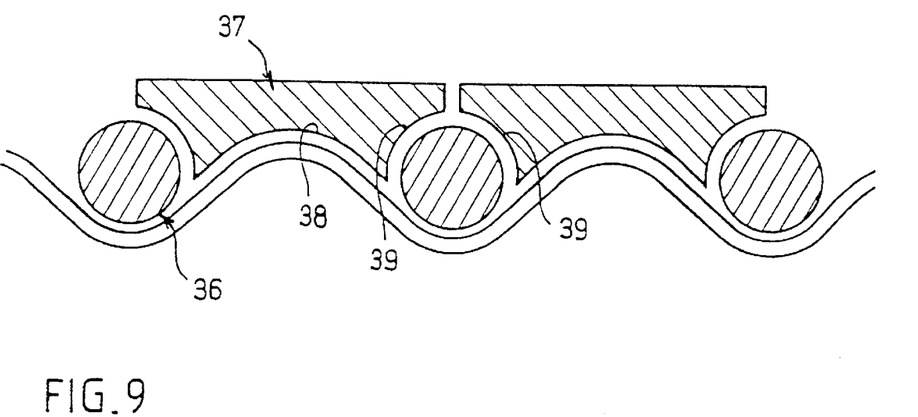

FIG. 9 illustrates another embodiment in which the pressure vault consists of a winding of two different wires 36, 37.

The shaped wire 36 is a round wire, the radius of which is approximately equal to the radius r:, and is housed in the troughs of the corrugation 8.

The shaped wire 37 is more complex and is adapted, in its central part 38, so as to match the shape of the convex part of the corrugation 8, the junction zone between the two shaped wires 36 and 37 lying more or less vertically in line with the trough of the corrugation. Of course, the lateral parts 39 of the shaped wire 37 must correspond to the round wire 36 in order to achieve a certain uniformity.

In all the embodiments, the consecutive or adjacent turns may have, on their external surfaces, recesses 40 with which connection devices, such as clips 41, engage in order to connect two consecutive or adjacent turns together, thus limiting excessive elongation of the pressure vault (FIG. 5).

In order to make it easier to extrude the anticollapse sleeve 3 onto the pressure vault 2, the latter has a cylindrical outer surface 42 when the pipe is straight, as illustrated in FIG. 2 and other figures.

The cylindrical outer surface 42 forms a good bearing surface for the anticollapse sleeve 3.

Moreover, it should be noted that, according to the invention, each armouring 4, 5 surrounding the anticollapse sleeve 3 consists of the helical winding of at least one ply of wire wound at a setting angle of less than 55°. Preferably, the flexible pipe comprises two plies of wound wires 4, 5 with the same setting angle but in opposite directions, the said plies themselves being surrounded by a sleeve 7 for protection and sealing, with or without a tape 6 being interposed.

The pressure vault 2 may be wound using a pair of identical wires or using two pairs of shaped wires, each of the latter pairs comprising a shaped wire of a given cross-section and another shaped wire of a cross-section which corresponds to the given cross-section.

A preferred process for forming the pressure vault 2/liner 1 assembly consists:

in unreeling, from a feed roll, a long thin tape;

in passing the said tape through forming means in order gradually to give it the shape of a hollow cylinder;

in continuously producing, along a generatrix or in a helix, a weld between the free edges in order to form a cylindrical impermeable hollow tube;

in passing the impermeable hollow tube through corrugating means consisting, for example, of press rollers and, optionally, of a rotating core having a helical corrugated surface; and in winding one or more shaped wires around the corrugated internal tube.

Such an assembly may be wound with a long length onto a storage reel, awaiting the completion of the flexible pipe.

Of course, other manufacturing processes may be used. Among these, mention may be made of that consisting in butt-joining short lengths of hollow cylinders and then in forming the necessary corrugations on the said hollow tube thus obtained before winding the shaped wire or wires constituting the pressure vault.

We claim:

1. A flexible pipe comprising:

an impermeable internal tube comprised of metal and including a tube wall which has a helical corrugation extending therealong, the tube wall having an outer surface on which the corrugation defines first rounded concave parts alternating with first rounded convex parts along the axis of the pipe;

a pressure vault around the internal tube comprised of at least one metal wire wound in the form of turns around the internal tube; the wound wire having an inner surface for being received at the outer surface of the internal tube, the wire inner surface includes second concave rounded parts and second convex rounded parts wherein the wire is wound on the internal tube such that the first concave rounded parts of the outer surface of the tube receive the second convex parts of the inner surface of the wound wire and the first convex rounded parts of the outer surface of the tube receive the second concave parts of the inner surface of the wire, such that the inner surface of the pressure vault and the outer surface of the tube generally correspond in shape;

the wire being of a thickness along the length of the tube such that there is a gap between successive turns of the wire around the internal tube such that the gap is greater than zero;

the corrugation in the tube having a height between the bottom of the first concave part and the top of the adjacent first convex part; the corrugation in the tube having a pitch between successive first convex parts or between successive first concave parts, wherein the corrugations in the internal tube having a pitch from corrugation to corrugation and wherein the ratio of the height of the corrugation to the pitch of the corrugation is between 0.035 and 1.

2. The pipe of claim 1, wherein the internal tube has an interior and a thickness between the interior and the outer surface; the height of the corrugation is relatively small such that the ratio of the height of the corrugation to the thickness of the internal tube is in the range of 1 to 30.

3. The pipe of claim 2, wherein the internal tube has a thickness at least equal to 0.15 mm.

4. A pipe according of claim 1, wherein the internal tube has an interior and a thickness between the interior and the outer surface; the height of the corrugation is relatively small such that the ratio of the height of the corrugation to the thickness of the internal tube is in the range of 1.5 to 20.

5. The pipe of claim 1, wherein the first convex rounded parts of the internal tube have a first radius of curvature and the first concave rounded parts of the internal tube have a second radius of curvature, and the ratio of the first and second radii of curvature is in the range between 1 and 10.

6. The pipe of claim 1, wherein the first convex rounded parts of the internal tube have a first radius of curvature and the first concave rounded parts of the internal tube have a second radius of curvature, and the ratio of the first and second radii of curvature is in the range between 1.5 and 5.

7. The pipe of claim 1, wherein the pressure vault is comprised of wound wire comprised of several cross-sectional shapes of wire, including a first shape of wire having the second concave rounded parts without having the second convex rounded parts and a second shape of wire having the second convex parts without having the second concave parts.

8. The pipe of claim 1, wherein the first convex rounded parts of the corrugation of the internal tube have radially outward crests; and the wound wire is so shaped and positioned on the tube that the gaps between consecutive turns of the wire are each approximately above and opposite one of the crests of the first convex rounded parts of the corrugation of the tube.

9. The pipe of claim 1, wherein the first concave rounded parts of the internal tube have radially inward troughs; and the wound wire is so shaped and positioned on the tube that the gaps between consecutive turns of the wire are at least approximately above one of the troughs of the first concave rounded parts of the corrugation of the tube.

10. The pipe of claim 1, wherein the outer surface of the internal tube has mid-parts between the successive first concave rounded part and first convex rounded part of the corrugation the wound wire being so shaped and being so positioned on the tube that the gaps between consecutive turns of the wire are each approximately above one of the mid-parts of the corrugation of the tube.

11. The pipe of claim 1, wherein along the axis of the pipe, the wound wire has a maximum width which is slightly less than the pitch of the corrugation in the internal tube for providing a gap between successive windings of the wire around the tube so that the difference between the width of the windings and the pitch of the corrugation corresponds to the gap of clearance between consecutive turns of the wire.

12. The pipe of claim 11, wherein the wire has such shape and cross-section along the axis of the pipe that each winding of the wire has two opposite lateral edges which are straight and perpendicular to the axis of the pipe.

13. The pipe of claim 11, wherein the wire has such shape and cross-section along the axis of the pipe that each winding of the wire has two opposite lateral edges which are convexly curved.

14. The pipe of claim 1, wherein along the axis of the pipe, the wire has a maximum width which is slightly less than half the pitch of the corrugation in the internal tube for providing a gap between successive windings of the wire around the tube.

15. The pipe of claim 14, wherein the wire has such shape and cross-section along the axis of the pipe that each winding of the wire has two opposite lateral edges which are straight and perpendicular to the axis of the pipe.

16. The pipe of claim 14, wherein the wire has such shape and cross-section along the axis of the pipe that each winding of the wire has two opposite lateral edges which are convexly curved.

17. The pipe of claim 1, wherein the wire has such shape and a cross-section along the axis of the pipe that each winding of the wire has two opposite lateral edges which are straight and perpendicular to the axis of the pipe.

18. The pipe of claim 1, wherein the wire has such shape and a cross-section along the axis of the pipe that each winding of the wire has two opposite lateral edges which are convexly curved.

19. The pipe of claim 1, wherein the internal tube is gas impermeable.

20. The pipe of claim 1, wherein the internal tube is resistant to a corrosive medium.

21. The pipe of claim 1, wherein the pressure vault is comprised of steel with a high mechanical strength.

22. The pipe of claim 1, wherein the internal tube is of such material, such thickness and such strength that the internal tube is not initially corrugated and the corrugations of the internal tube are formed upon winding onto the tube of the wire forming the pressure vault around the internal tube.

23. The pipe of claim 1, further comprising a plastic sleeve around the pressure vault.

24. The pipe of claim 23, wherein the outer surface of the pressure vault has an approximately cylindrically general shape when the pipe is straight, whereby the outer surface of the pressure vault forms a bearing sleeve for the plastic sleeve and the plastic sleeve being wrapped around the bearing surface.

25. The pipe of claim 23, further comprising an armoring resistant to tensile loads on the outside of the plastic sleeve, the armoring comprising a helical winding of at least one ply of wire.

26. The pipe of claim 25, wherein each ply of wire in the armoring is wound at a setting angle of less than 55° with respect to the axis of the pipe.

27. The pipe of claim 25, wherein the armoring is comprised of two plies of wire wound one around the other, with each ply being at a setting angle with respect to the axis of the pipe and the respective setting angles of the two plies being angles in opposite directions; and a protective sleeve outside the armoring plies.

28. The pipe of claim 25, wherein the armoring is comprised of a material having a high modulus of elasticity and a high mechanical strength.

29. The pipe of claim 1, wherein the shaped wire windings each have a recess formed therein and connecting devices being provided between the recesses of two windings for connecting consecutive turns of the winding.

* * * * *